United States Patent [19]
Christopher

[11] 4,061,114
[45] Dec. 6, 1977

[54] LEAN CHARGE IGNITION SYSTEM

[76] Inventor: Nathan H. Christopher, 16833 Melbourne Drive, Laurel, Md. 20810

[21] Appl. No.: 716,095

[22] Filed: Aug. 20, 1976

[51] Int. Cl.² ............ F02B 3/06; F02B 3/08; F02B 3/10
[52] U.S. Cl. ............ 123/32 SJ; 123/139 AJ; 239/289
[58] Field of Search ............ 123/32 SJ, 139 AJ; 239/289, 87

[56] References Cited
U.S. PATENT DOCUMENTS

| | | | |
|---|---|---|---|
| 2,680,651 | 6/1954 | Berlyn | 239/87 |
| 3,040,989 | 6/1962 | Massal | 239/87 |
| 3,186,386 | 6/1965 | Papst | 123/32 SJ |
| 3,926,169 | 12/1975 | Leshner | 123/32 SJ |

*Primary Examiner*—Charles J. Myhre
*Assistant Examiner*—R. A. Nelli
*Attorney, Agent, or Firm*—Morton J. Rosenberg

[57] ABSTRACT

An improved lean charge fuel ignition system for use with internal combustion engines and is conceptually based on the stratified charge condition. This system has a fuel igniter mechanism which includes a pair of passages formed in one of the electrodes of the fuel igniter. Enrichment fuel is injected into the neighborhood of a spark gap which is in a secondary chamber containing a lean fuel-air mixture. Upon ignition of the resulting enriched mixture a flame front propagates to the engine cylinder chamber where ignition of the lean mixture of fuel and air is initiated. The second passage formed within one of the electrodes of the fuel igniter means is connected to a fuel injection device which includes a spray pump actuated by the standard cycling pressures formed within the engine cylinder chamber to provide necessary metering and flow of enrichment fuel through the second passage of the electrodes into the neighborhood of the spark gap.

9 Claims, 2 Drawing Figures

LEAN CHARGE IGNITION SYSTEM

BACKGROUND OF THE INVENTION

1. Field of the Invention

This invention relates to fuel ignition systems for internal combustion engines. In particular, this invention relates to improved systems operating on a stratified charge spark ignition concept. Still further, this invention relates to fuel ignition systems utilizing a fuel igniter having hollow electrodes to insert additional fuel into a pre-ignition chamber to form a rich fuel-air mixture. More in particular, this invention is directed to fuel igniter mechanisms having a pair of passages, one of which is utilized for insertion of additional fuel and the other for flow distribution of said additional fuel by means of the normal pressure differentials provided during an engine cycle. Still further, this invention relates to improved fuel ignition systems where the fuel injection mechanism includes a spray pump operating through appropriate pressure differentials formed in an electrode of a fuel igniter device.

2. Prior Art

Fuel ignition systems for internal combustion engines are well known in the art. However, in general, gasoline engines have a relatively low efficiency and provide a high exhaust contaminant pollution factor. Thus, there is a lower efficiency provided in the utilization of fuel in standard internal combustion engines. Additionally, there is high pollution content from fuel vapors within carburetors and fuel tanks as well as from the total exhaust of the engines.

In some prior engines, stratified charges are formed by providing for a separate pre-ignition chamber formed out of the cylinder head of the engine and having a direct passage with the engine cylinder chambers. In such prior ignition systems, the rich fuel-air mixture is inserted into the initial cavity and the flame propagation is directed into the main cylinder for ignition of a lean fuel-air mixture. In such prior ignition systems, the cost of providing for retooling in the engine head is excessive and results in extreme costs.

In other prior ignition systems, there is provision made for hollow electrodes through a spark ignition mechanism to provide for initial combustion of a rich fuel-air mixture. However, in some such prior systems the injection of the rich fuel-air mixture is provided by external devices attached to the fuel ignition mechanism and results in complicated hardware mechanisms. Such prior systems lead to extended costs for the user and do not allow for a modular ignition system which may be inserted by a user. Additionally, prior systems of this nature, do not incorporate the normal pressure differentials associated with internal combustion engine cycling to obtain the rich fuel-air mixture. Thus, by necessity such systems must have an extended complexity of operation and in hardware maintenance. Additionally and more particularly such prior systems do not provide for a high reliability in the operating mode.

In other prior-pre-ignition systems, the fuel ignition mechanism is unique to a particular engine and are in general not adapted to be inserted into existing and standard spark plug sockets. This has the effect of increasing the cost of insertion of such pre-ignition systems.

In other types of pre-ignition systems, a plurality of connections to each igniter are necessitated which provides for increased complexity in hardware and a lower reliability factor.

SUMMARY OF THE INVENTION

An improved fuel ignition system for internal combustion engines having at least one engine cylinder. The improved fuel ignition system includes a fuel igniter mechanism having a pair of electrodes where one of the electrodes has (1) a first passage and (2) a second passage for inlet of additional fuel into a neighborhood of a spark gap formed by the electrodes. A fuel injection mechanism connected to the fuel igniter mechanism has a pair of fuel ignition passages which are aligned with the first and second passages of the fuel igniter mechanism. The fuel injection mechanism is coupled to a fuel supply for displacing the fuel through the fuel igniter mechanism second passage.

DESCRIPTION OF THE PREFERRED EMBODIMENTS

Figure 1:
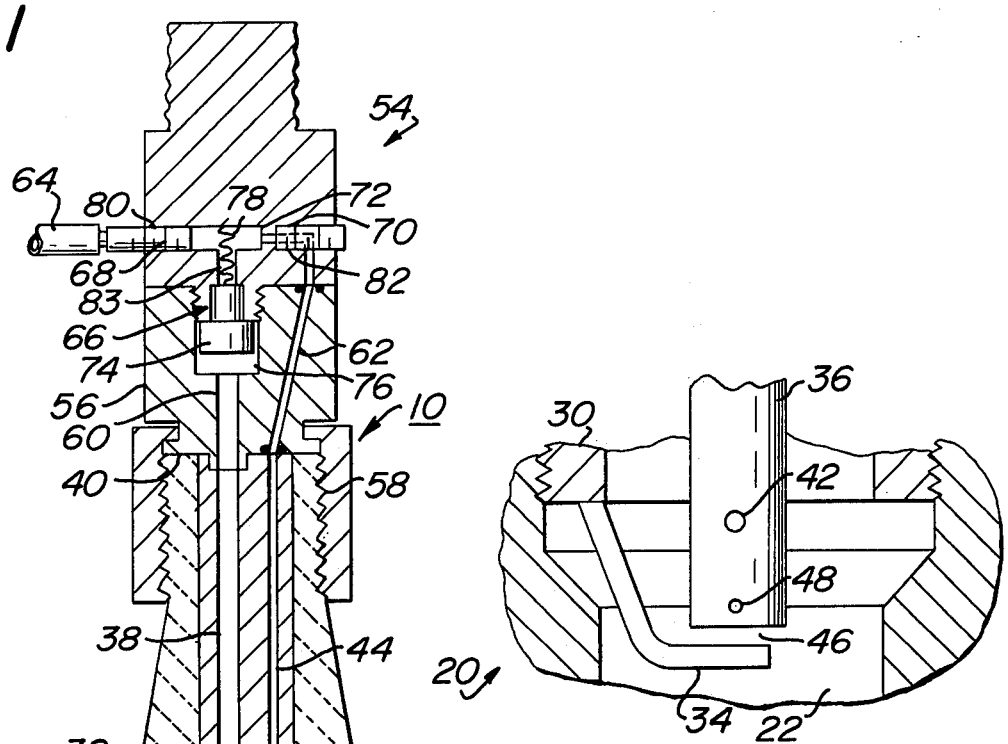
FIG. 1 is an elevation sectional view of the improved fuel ignition system; and, FIG. 2 is a partial cut away of FIG. 1 taken along the section lines 2—2 of FIG. 1.
Figure 2:
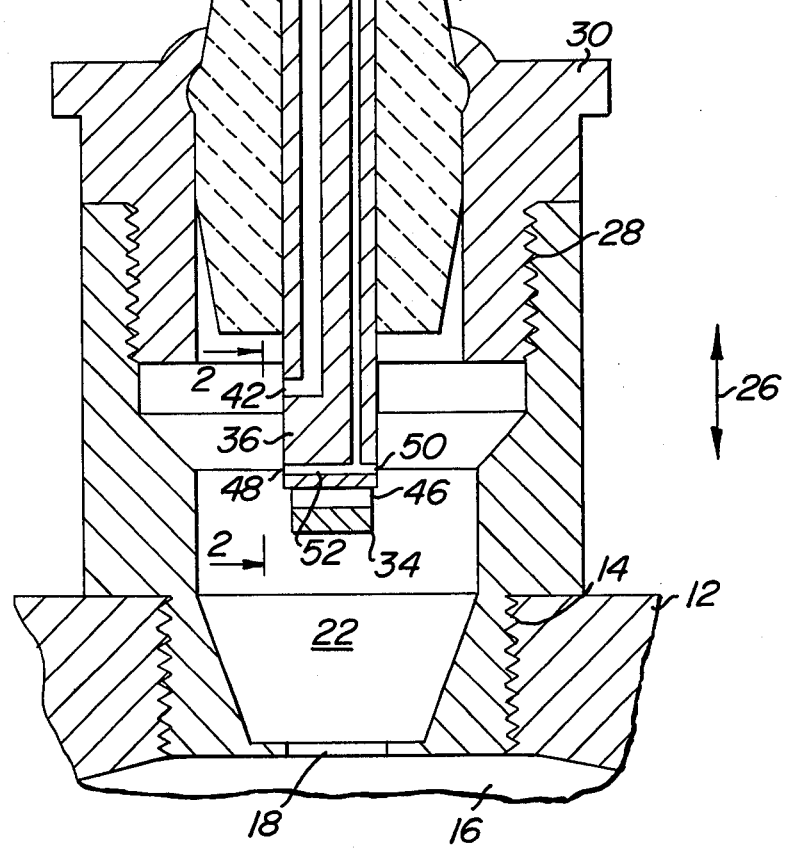

Referring now to FIGS. 1 and 2 there is shown improved fuel ignition system 10 for operation of an internal combustion engine with a relatively lean mixture of fuel and air. In overall concept, improved fuel ignition system 10 is directed to a stratified-charge type of ignition system wherein a small amount of a rich mixture of fuel and air is initially ignited, and the propogating flame front ignites a leaner mixture of fuel and air inserted into the primary cylinder of an internal combustion engine. In operation, this has the effect of minimizing the fuel consumption as well as providing for a maximization of the combustion process resulting in a minimization of pollutants being emitted from the engine.

Referring now to FIG. 1, fuel ignition system 10 is seen to be secured to engine cylinder head 12 through a releasably secured attachment such as a threaded engagement shown at section portion 14. Engine cylinder chamber 16 communicates with the various elements of ignition system 10 through passage or orifice 18 formqd in a lower surface of ignition chamber housing 20.

As is seen, housing 20 includes ignition chamber 22 which serves as a pre-ignition enclosure. Chamber 22 defines the volume wherein a relatively rich mixture of fuel-to-air is initially ignited to produce a flame front which passes through opening 18 into engine cylinder chamber 16 for ignition of a lean mixture of fuel and air inserted thereon. Volume consideration of ignition chamber 22 are not critical to the inventive concept as herein described, however, the volume must be of sufficient size to provide flame front propagation into cylinder 16. In several experiments, successful operation has been attained utilizing a volume of approximately 0.07 cubic inches.

Fuel igniter device 24 is releasably mounted to igniter chamber housing 20 through threaded member 28. Ignition device 24 extends in a longitudinal direction defined by directional arrow 26 as shown in FIG. 1. Device 24 is formed of base housing 30 and has a standard ceramic body portion 32 extending in longitudinal direction 26 as is shown. Portions of fuel igniter device 24, which is in the form of a modified spark plug, extend partially into ignition chamber 22 for the pre-ignition of a rich mixture of fuel and air as will be described in following paragraphs.

Fuel igniter device 24, similar to a standard spark plug has ground electrode 34 and central electrode 36 passing in longitudinal direction 26. Ground electrode 34, as is shown in FIG. 2 is connected or coupled to igniter base housing 30. Both of electrodes 34 and 36 are formed of a highly electrically conducting material, well known in the art.

Central electrode 36, serving as the positive electrode in improved fuel ignition system 10, includes longitudinally directed first passage 38 which substantially passes through a major portion of igniter device 24 in longitudinal direction 26. In particular, first passage 38 passes from fuel igniter device upper surface 40 to opening 42 on an opposing end of ignition device 24. Opening 42 interfaces in open relation with ignition chamber 22 as is shown in FIG. 1.

Central electrode 36 also includes second passage 44 which extends in longitudinal direction 26 in substantially parallel relation to first passage 38. Second passage 44 provides a path for an inlet or discharge of the fuel to be added into spark gap neighborhood 46 within ignition chamber 22. As was the case for first passage 38, second passage 44 extends from device upper surface 40 to a lower end thereof, and terminates in a pair of openings or orifices 48 and 50 formed in opposing transverse ends of central electrode 36.

Opposing transverse openings 48 and 50 are mated each to the other through transverse passage 52 which is intersected by second passage 44. In overall concept, added fuel is inserted through second passage 44 into transverse passage 52 and is forceably driven into spark gap neighborhood 46 between electrodes 34 and 36. By allowing a transverse passage 52, the fuel is substantially uniformly sprayed into spark gap neighborhood 46 and has been found to provide a more symmetrical and uniform initial flame front for passage through orifice 18 into engine cylinder chamber 16 where combustion of a lean mixture of fuel and air is initiated. Thus, transverse passage 52 provides for a divergent type of passage conduit into spark gap neighborhood 46 and produces a relatively symmetrical initial flame front.

An important mechanism for improved fuel ignition system 10 is the mechanism and mode for injecting an appropriate amount of fuel into ignition chamber 22. Appropriate injection and metering is accomplished by fuel injection mechanism 54. As is seen in FIG. 1, injection mechanism 54 includes injection mechanism housing 56 which is secured to fuel igniter body 32 through a threaded releasable secured portion 58. Mechanism 54 includes a pressure passage 60 extending in longitudinal direction 26 and a fuel injection passage 62 directionally positioned in a similar longitudinal extension.

Both pressure and fuel injection passages 60 and 62 extend to a lower surface of injection housing 56 and when secured to igniter body 32 are contiguous to device upper surface 40. Additionally, pressure passage 60 is positionally aligned with first passage 38 to provide a through opening for purposes to be described in following paragraphs. In a similar manner, fuel injection passage 62 is positionally aligned with second passage 44 to also provide a through opening in order that fuel may be injected through second injection passage 62, second passage 44 formed within igniter body 32 and outwardly into ignition chamber 22 by passage through transverse tunnel or passage 52. Mechanism 54 is connected to a fuel supply through conduit 64 where fuel is inserted into mechanism 54 for ultimate dispersion within ignition chamber 22.

Fuel injection mechanism 54 includes spray pump device 66 for inserting and metering the predetermined quantity of fuel to pre-ignition chamber 22 in the neighborhood of spark gap 46. A pair of check valves 68 and 70 are mounted in transverse passage 72 in order to provide for the appropriate direction of fuel flow. Check valve 68, which may be of a standard type one-way ball valve, is coupled to fuel supply conduit 64 and only permits fuel to flow internal to fuel ignition mechanism 54 while providing a flow termination point for any fuel being forced back into supply conduit 64.

In a similar manner, check valve 70 permits fuel to flow through second injection passage 62 into second passage 44 of igniter body 32 but resists flow passing in an opposing direction.

Spray pump mechanism 66 includes piston 74 which is moveable in longitudinal direction 26 within piston chamber 76. Piston chamber 76, and thus in effect piston 74, is coupled to pressure passage 60 which is aligned with first passage 38 extending within igniter body 32. Piston 74 is provided for displacing the additional fuel into igniter chamber 22 responsive to a compression stroke within engine cylinder chamber 16. Additionally, piston 74 is biased in a downward direction through spring mechanism 78. For purposes of clarification and ease of description of operation, transverse passage 72 of fuel injection mechanism 54 may be seen to be made of first conduit 80 within which check valve 68 is mounted and where first conduit 80 is coupled to the fuel supply through conduit 64 on one end and piston chamber or fuel insertion chamber 83 on an opposing end. Additionally, second conduit 82 within which check valve 70 is mounted is coupled to fuel insertion chamber 83 and fuel injection passageway 62.

In operation, during a normal intake and exhaust stroke of an internal combustion engine, spray pump mechanism 66 operates through the natural pressure differentials provided by the internal combustion engine. During the exhaust and intake stroke, piston member 74 is forced in its biased direction through appropriate pressure differential and spring mechanism 78 into a downward location with respect to piston chamber 76.

Thus, in this portion of the engine cycle, piston 74 is located in contiguous or adjacent manner to piston chamber lower end 76. Check valve 68 is open and fuel is passed through fuel supply conduit 64 to substantially fill insertion chamber 83. The volume of fuel to be injected in each cycle has been found to be approximately 0.0015 cubic inches which is the approximate volume to be displaced by piston or spray pump cylinder 74.

In this portion of the engine cycle, check valve 70 is closed by suction created by piston 74 as bias spring mechanism 78 force is applied. During the compression stroke, a generally high pressure is provided in ignition chamber 22 and such is transmitted through orifice 42, passage 38 and mechanism 54 passage 60 to provide a high force concentration on the lower end or surface of piston 74. This has the effect of driving piston 74 in longitudinal direction 26 upwardly against the biasing action of coil spring 78 and provide high enough pressure to open check valve 70 and permit flow of fuel contained within fuel insertion chamber 83 through passage 62, passage 44 and transverse passage 52 formed within central electrode 36.

In this manner, fuel is forceably displaced through opposing openings 48 and 50 into spark gap neighborhood 46 where it mixes with the lean gas-air mixture present and is ignited through electrical actuation of electrodes 36 and 34. This provides for an initial flame front to be propagated through orifice 18 and to further ignite a lean mixture of fuel and air within engine cylinder chamber 16.

In order to provide for appropriate spraying action it has been found through successful experimentation that pressure passageway 60 has an approximate diameter of 0.06 inches. Additionally, piston 74 incorporates a large diameter at a lower end of piston 74 is approximately 0.28 inches with the upper diameter being approximately 0.2 inches. The stroke of piston 74 is approximately 0.19 inches and coupled with the diameter of piston member 74 provides for a displacement volume of approximately 0.0015 cubic inches.

The lean burning mixture formed in primary or engine cylinder chamber 16 is generally maintained within the range of 15:1 and may generally be obtained by reducing the area of the primary carburetor jets by about 20% and by correcting if such is necessary, the emulsion tubular units. The fuel which is inserted through conduit 64 results in a fuel to air ratio of approximately 12:1-14:1 within the igniter chamber 22. These ratios have been found to provide for a highly reliable ignition and maximization of the speed of flame propagation from igniter chamber 22 into primary or cylinder chamber 16 through orifice 18. In a four stroke cycle engine, with a speed of 10,000 rpm it has been found that the time available for injection of the additional fuel into chamber 22 is approximately 1.5 milliseconds and allows for sufficient time for appropriate fuel flow to and from spray mechanism 66.

It will be understood that in some cases igniter chamber housing 20 containing ignition chamber 22 may be dispensed with. In such cases, igniter base housing 30 may be adapted to matingly engage threaded engagement section 14. Central electrode 36 and ground electrode 34 would then extend at least partially into cylinder chamber 16 for ignition therein.

While the invention has been described with certain specific embodiments thereof, it will now be understood that further modifications will suggest themselves to those skilled in the art, and it is intended to cover such modifications within the scope of the appended claims.

What is claimed:

1. An improved fuel ignition system for an internal combustion engine having at least one engine cylinder, comprising:
   a. fuel igniter means having a pair of electrodes, one of said electrodes having (1) a first passage, and (2) a second passage for inlet of fuel into a neighborhood of a spark gap formed by said electrodes; and,
   b. fuel injection means having a pair of fuel injection means passages aligned with said first and second passages of said fuel igniter means, said fuel injection means being coupled to a fuel supply for displacing said fuel through said fuel igniter means second passage.

2. The improved fuel ignition system as recited in claim 1 where said fuel injection means includes
   a. spray pump means for inserting a predetermined quantity of said fuel into said neighborhood of said spark gap; and,
   b. an igniter chamber enclosing said spark gap formed by said electrodes.

3. The improved fuel ignition system as recited in claim 2 wherein said spray pump means includes:
   piston means coupled to a first fuel injection means passage aligned with said fuel igniter means first passage, said piston means for displacing said fuel into said igniter chamber responsive to a compression stroke within said engine cylinder.

4. The improved fuel ignition system as recited in claim 3 wherein said pump means includes:
   a. a first conduit coupled to said fuel supply and a fuel insertion chamber; and,
   b. a second conduit coupled to said fuel insertion chamber and a second fuel injection means passage aligned with said fuel igniter means second passage.

5. The improved fuel ignition system as recited in claim 4 where said first conduit includes first check valve means for providing flow from said fuel supply to said fuel insertion chamber and negating flow opposingly.

6. The improved fuel ignition system as recited in claim 4 where said second conduit includes second check valve means being actuatable to provide flow from said fuel insertion chamber to said fuel igniter means second passage.

7. The improved fuel ignition system as recited in claim 1 where said fuel igniter means includes spark plug means where said electrode having said first and second passages includes means for uniformly spraying said fuel mixture into said spark gap neighborhood.

8. The improved fuel ignition system as recited in claim 7 where said uniform spraying means includes said second passage having divergent flow passage conduits into said spark gap neighborhood.

9. The improved fuel ignition system as recited in claim 1 where said fuel igniter means is in continuous relation to said engine cylinder.

* * * * *